(12) United States Patent
Galante et al.

(10) Patent No.: US 12,365,539 B2
(45) Date of Patent: Jul. 22, 2025

(54) METHOD FOR AUTOMATICALLY HANDLING A PLURALITY OF PRODUCT CONTAINERS, AND A RELATED SYSTEM

(71) Applicant: Fameccanica.Data S.p.A., San Giovanni Teatino (IT)

(72) Inventors: Dario Galante, San Giovanni Teatino (IT); Fabrizio Faieta, San Giovanni Teatino (IT)

(73) Assignee: Fameccanica.Data S.p.A., San Giovanni Teatino Chieti (IT)

( * ) Notice: Subject to any disclaimer, the term of this patent is extended or adjusted under 35 U.S.C. 154(b) by 436 days.

(21) Appl. No.: 17/986,964

(22) Filed: Nov. 15, 2022

(65) Prior Publication Data

US 2023/0159273 A1 May 25, 2023

(30) Foreign Application Priority Data

Nov. 19, 2021 (EP) .................................. 21209385

(51) Int. Cl.
 *B65G 1/06* (2006.01)
 *B65G 1/137* (2006.01)
 *B65G 60/00* (2006.01)

(52) U.S. Cl.
 CPC ............. *B65G 1/06* (2013.01); *B65G 1/137* (2013.01); *B65G 60/00* (2013.01); *B65G 2203/0208* (2013.01)

(58) Field of Classification Search
 CPC ........ B65G 1/137; B65G 1/06; B65G 1/0435; B65G 1/0421
 See application file for complete search history.

(56) References Cited

U.S. PATENT DOCUMENTS

| | | | |
|---|---|---|---|
| 2018/0029796 A1* | 2/2018 | De Vries | B65G 1/0435 |
| 2021/0276796 A1* | 9/2021 | Long | B65G 1/1371 |
| 2022/0185583 A1* | 6/2022 | Kong | B07C 3/008 |

FOREIGN PATENT DOCUMENTS

| | | |
|---|---|---|
| EP | 1842803 A1 | 10/2007 |
| JP | H07137808 A | 5/1995 |
| JP | H11292212 A | 10/1999 |
| JP | 2020066483 A | 4/2020 |

OTHER PUBLICATIONS

European Search Report dated Apr. 13, 2022. 6 pages.

* cited by examiner

*Primary Examiner* — Kaitlin S Joerger
(74) *Attorney, Agent, or Firm* — RMCK Law Group PLC

(57) ABSTRACT

A method for automatically handling a plurality of product containers includes the steps of: providing a container exchange apparatus having at least one platform for temporarily hosting containers to be transferred; moving the at least one platform along a conveyor device and a shelving unit; and driving shifting means for exchanging containers from the conveyor device to the shelving unit, and vice-versa, via the at least one platform.

11 Claims, 3 Drawing Sheets

METHOD FOR AUTOMATICALLY HANDLING A PLURALITY OF PRODUCT CONTAINERS, AND A RELATED SYSTEM

CROSS-REFERENCE TO RELATED APPLICATION

This application claims priority to European Patent Application No. 21209385.0 filed Nov. 19, 2021. The disclosure of the above application is incorporated herein by reference in its entirety.

FIELD OF INVENTION

The present invention relates in general to the field of logistics, in particular to the field of logistics in warehouses or industrial plants for managing products, containers, boxes, packages, materials, etc.

More specifically, the invention relates to a method for automatically handling a plurality of product containers, such as tote-boxes which are used in industrial and commercial environments for secure stacking and effective content protection.

Embodiments of the present invention also relates to an automatic warehouse system for handling a plurality of product containers.

DESCRIPTION OF THE RELATED ART

To date, logistic activities related to managing product containers, packages and boxes to be delivered to respective destinations are substantially totally entrusted to manual operations carried out by trained operators. Usually, the products to be delivered are contained in respective containers, such as tote-boxes, which are stacked at pick-up stations, in which a human operator reads a barcode through a barcode reader, or visually reads the label, and manually grasps the container for delivering to a specific shipping area.

According to known solutions, the containers are transported by means of a conveyor towards a pick-up station. An operator manually moves the containers from the conveyor to a shelving unit for holding a plurality of containers. When the containers have to be shipped, an operator manually picks the containers for delivering to a proper shipping area.

The main drawback of these known solutions is given by the fact that the operations are substantially totally manual, therefore subjected to mistakes and requiring proper training for the operators, without ensuring high repeatability and reliability of the operations. Furthermore, the known solutions may cause non-ergonomic actions to be carried out by the operators.

OBJECT AND SUMMARY OF THE INVENTION

The object of the present invention is to provide a method and a system for automatically handling a plurality of product containers which overcome the problems and the limitations of the prior art.

In accordance with the present invention, this object is achieved by a method having the features of claim 1.

Optional features of the invention form the subject of the dependent claims.

The claims are an integral part of the disclosure submitted in relation to the invention.

BRIEF DESCRIPTION OF THE DRAWINGS

Further characteristics and advantages of the invention will become clear from the following description, given purely as a non-limiting example, with reference to the attached drawings, wherein.

DETAILED DESCRIPTION

Figure 1:
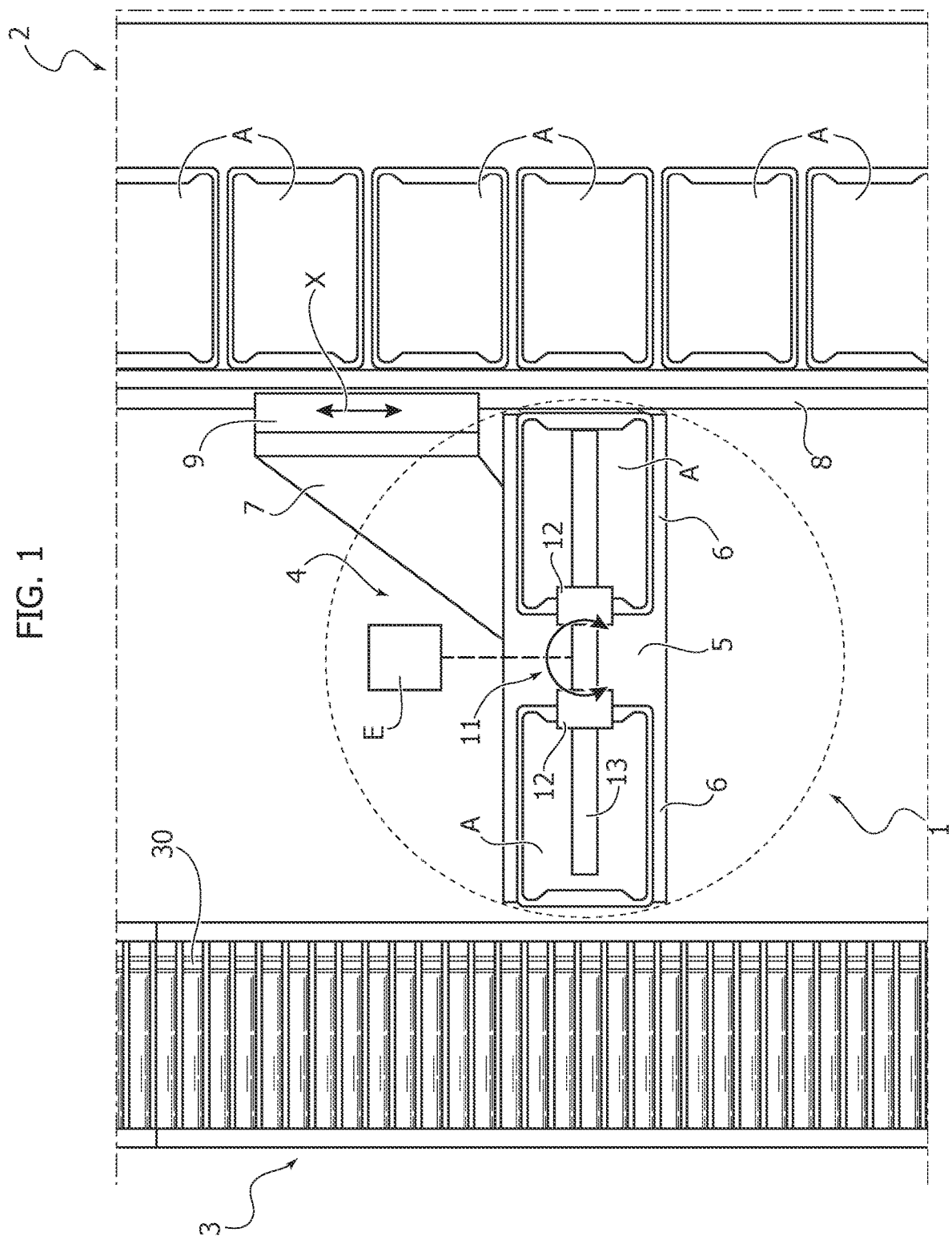
FIG. 1 is a schematic plan view of an automatic system for handling product containers, according to a preferred embodiment of the present invention.
Figure 2:
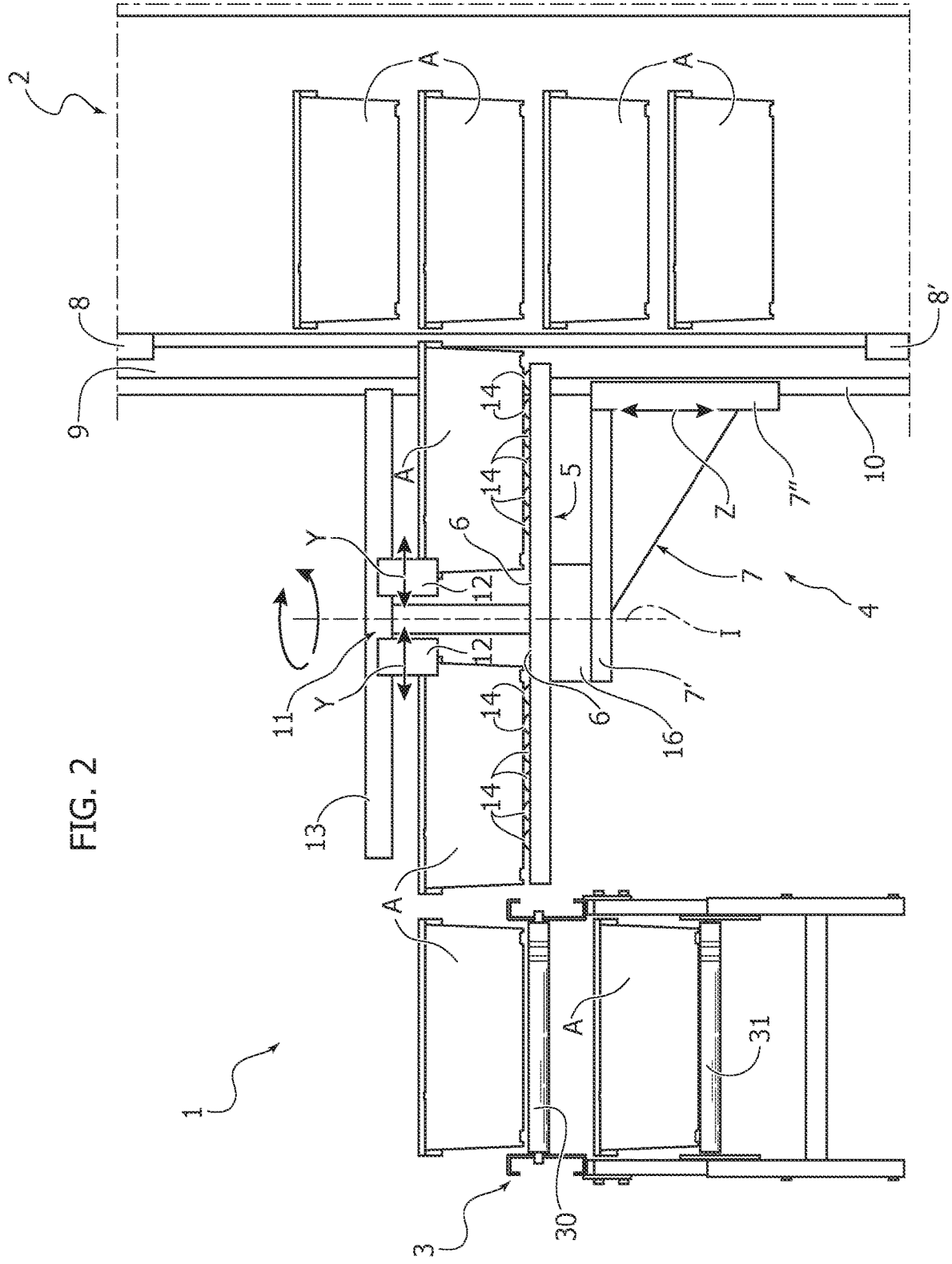
FIG. 2 is a schematic side view of the system illustrated in FIG. 1, and FIGS. 3, 4 are schematic views showing enlarged details of the system illustrated in the previous figures.

With reference to FIGS. 1, 2, numeral reference 1 indicates an automatic warehouse system for handling product containers A. In the example shown in the figures, the product containers A are tote-boxes, provided for containing a plurality of products—for example consumer products—. The tote-boxes are widely used in industrial and commercial environments for secure stacking and content protection, in compliance with the industrial standards and regulations. Naturally, the present invention is also applicable to any kind of containers A having different shape and size, with respect to those illustrated in the figures.

The automatic warehouse system 1 comprises a conveyor device 3 provided for automatically moving a plurality of containers A from one location to another. By way of non-limiting example, the figures refer to a conveyor device of the motor-driven-roller type.

According to a preferred embodiment, the conveyor device 3 may comprise a first conveyor branch 30 configured for automatically transferring a plurality of empty containers A intended to be filled with products, for forming full containers A ready to be shipped. The conveyor device 3 may comprise a second conveyor branch 31 configured for automatically transferring a plurality of full containers A. The first and second conveyor branches 30, 31 are configured for optimizing the conveying flow from/to respective storage areas.

In one or more embodiments, the first and second branches 30, 31 are vertically overlapped to each other, in order to define a lower branch and an upper branch respectively provided for conveying empty and full containers A (or vice-versa). In this connection, in one more embodiments, the conveyor device 3 may comprise further branches vertically overlapped to the first and second branches 30, 31, in order to provide multiple vertical overlapped branches.

As explained more in detail in the following, the aforementioned conveyor device 3 is provided for enabling simultaneous circulation of both empty containers A to be filled with products and formed full containers A to be delivered to a proper final destination.

According to a further feature of the invention, the automatic warehouse system 1 comprises at least one shelving unit 2 comprising a plurality of compartments for holding and storing containers A arranged in rows. According to a preferred embodiment shown in FIGS. 1, 2, the rows are defined by a plurality of compartments vertically and horizontally adjacent to each other, so as to provide multiple vertical and horizontal rows of containers A. In one or more embodiments, the shelving unit 2 is provided for holding both empty and full containers A. In one or more embodiments, the shelving unit 2 is a powered carousel shelving unit configured to bring individual shelves to a standard accessible height at a front access opening. In one or more embodiments, the conveying direction of the conveyor device 3 and the horizontal rows of containers A stacked on the shelving unit 2 are arranged parallel to each other.

According to the invention, the automatic warehouse system 1 comprises at least one container exchange apparatus 4 interposed between the shelving unit 2 and the conveyor 3, configured for exchanging containers A from the conveyor device 3 to the shelving unit 2 and vice-versa. To this end, the shelving unit 2 is arranged with the compartments facing the container exchange apparatus 4.

As illustrated in the figures, the containers exchange apparatus 4 comprises a platform 5 provided for automatically receiving containers A from the shelving unit 2 and the conveyor device 3. The platform 5 comprises areas 6 for temporarily hosting the containers A to be exchanged to the shelving unit 2 and the conveyor device 3. By way of the non-limiting example of the figures, the platform 5 comprises two holding areas 6, in such a way that the platform 5 is configured for simultaneously temporarily hosting two containers A (a first container A taken from the conveyor device 3 to be transferred to the shelving unit 2 and a second container A taken from the shelving unit 2 to be transferred to the conveyor device 3).

As indicated more in detail in the following, the platform 5 is provided for horizontally and vertically sliding through the conveyor device 3 and the shelving unit 2 along horizontal and vertical directions X,Z, in such a way that the platform 5 may be positioned with its support surface defined by the holding areas 6, coplanar with the respective surfaces of a branch of the conveyor device 3 and a determined compartment of the shelving unit 2. In this connection, the platform 5 may be arranged transversely with respect to the conveying direction of the conveyor device 3 and to the horizontal rows of containers A stacked on the shelving unit 2 (FIG. 1). In other words, the platform 5 may be driven vertically and horizontally alongside the conveyor device 3 and the shelving unit 2, for providing a shifting continuous surface with one conveyor branch and a determined compartment of the shelving unit 2.

In one or more embodiments, the container exchange apparatus 4 comprises a support element 7 having a first portion 7' connected to the platform 5 and a second portion 7" connected to a plurality of rails 8,8',10 provided for enabling horizontal and vertical travelling of the platform 5 alongside the conveyor device 3 and the shelving unit 2.

According to preferred arrangements of the invention shown in the figures, the rails comprise at least one horizontal rail 8 (two horizontal rails 8,8' in the example of the figures) spaced along the shelving unit 2 or the conveyor device 3 and a beam element 9 slidably mounted on the horizontal rail 8. The horizontal rails 8,8' may be provided at different heights or both on the ground on which rests the shelving unit 2. The support element 7 is slidably mounted on the beam element 9 along a vertical direction Z. To this end, a vertical rail 10 may be provided on the beam element 9 and the second portion 7" of the support element 7 is slidably mounted on the vertical rail 10, so as to enable vertical travelling of the platform 5 along the vertical rows of containers A stacked on the shelving unit 2 and/or along the branches 30, 31 spaced at different heights. Due to the aforementioned arrangement, the platform 5 may be positioned with its support surface defined by the holding area 6, coplanar with the respective surfaces of a branch of the conveyor device 3 and a determined shelf of the shelving unit 2.

Naturally, the system 1 comprises a plurality of actuators for driving the vertical and horizontal movement of the platform 5. The actuators are not illustrated in the figures since they can be made according to any known configuration, and since elimination of these details from the figures makes the latter more readily and easily understood.

According to a further important feature of the invention, the container exchange apparatus 4 comprises shifting means 11 configured for transferring containers A from the shelving unit 2 and the conveyor device 3 to the platform 5, and vice-versa. The shifting means 11 may be driven between a passive position in which they do not interfere with the containers A conveyed on the conveyor device 3 and stacked on the shelving unit 2, and an active position in which they drive a transverse movement of the containers A for carrying selected containers A onboard the holding areas 6 or releasing the containers A hosted on the holding areas 6.

As illustrated in the figures, the shifting means 11 may comprise at least one picking unit 12 slidably mounted along the platform 5. In one or more embodiments, the container exchange apparatus 4 comprises a number of picking units 12 corresponding to the number of the holding areas 6, so that each picking unit 12 acts on a respective holding area 6. Preferably, the shifting means 11 comprises a pair of picking units 12, respectively associated to the pair of holding areas 6 of the platform 5.

In one or more embodiments, the picking unit 12 is slidably mounted along a further horizontal direction Y perpendicular to the horizontal sliding direction X of the platform 5 (FIGS. 1,2). The picking unit 12 may be slidably mounted on at least one auxiliary rail 13, which may be provided directly onboard the platform 5.

According to a preferred arrangement of the invention, the system 1 is configured for simultaneously transferring containers A to/from both the holding areas 6, so as to reduce handling cycle downtimes. Naturally, the picking units 12 may be driven (by actuators not illustrated) once the platform 5 is positioned correctly coplanar and next to a horizontal row of the containers A stacked on the shelving unit 2 and to a branch of the conveyor device 3.

Figures 3, 4:
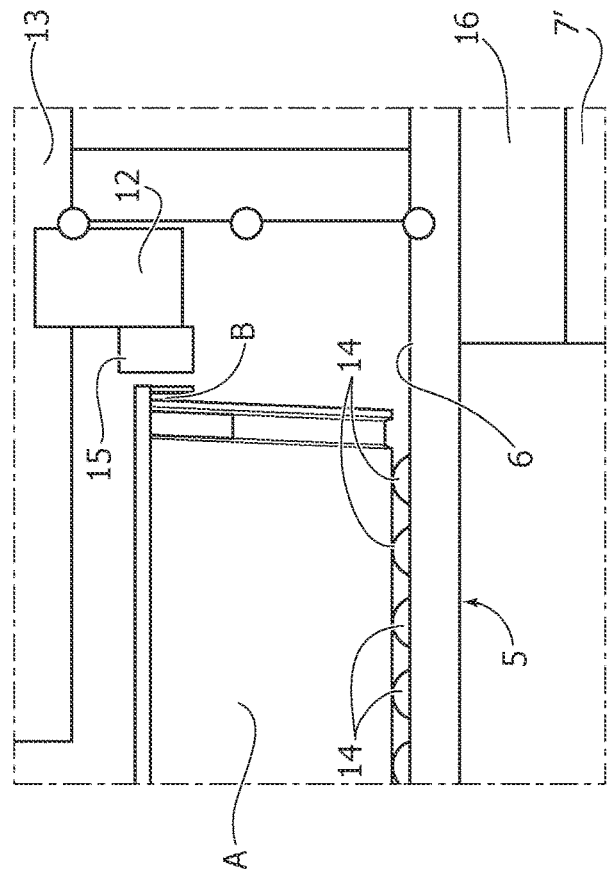

In one or more embodiments, the picking unit 12 is configured for pushing a container A from one holding area 6 to the conveyor device 3 or the shelving unit 2, and pulling a container A from the conveyor device 3 or the shelving unit 2 towards the holding area 6. The pushing operation of one container A temporarily hosted on the holding area 6 may be accomplished by a pressure carried out by the horizontal movement of the picking unit 12 along the platform 5. The pressure may be applied on a lateral wall of the container A. As illustrated in FIG. 3, the picking unit 12 may comprise a picking element 15 which may be actuated for grasping the container A and pulling the container A from the conveyor device 3 or the shelving unit 2 to the platform 5. Preferably, the picking element 15 may be actuated along multiple directions for grasping one lateral handle B of the container A. Naturally, the picking unit 12 may comprise picking elements 15 of different types, such as vacuum grippers, magnets, mechanical grippers, etc. The picking unit 12 may incorporate suitable sensors for detecting the effective gripping of the container A.

According to a further preferred feature illustrated in FIG. 4, the shifting means 11 may comprise a plurality of rollers 14 (for example motorized rollers) provided at the support surface of the holding areas 6, for facilitating shifting of the containers A.

In one or more embodiments, the container exchange apparatus 4 comprises a swivel unit 16 associated with the platform 5, provided for swivelling the platform 5 around a vertical axis I substantially about 180°, in opposite directions. The swivelling operation—driven by an actuator not illustrated—modifies the position of the containers A temporarily carried on the holding areas 6, with respect to the conveyor device 3 and the shelving unit 2. In other words, by the actuation of the swivelling unit 16, a first container A positioned on one holding area 6 adjacent to the conveyor device 3 (the first container A has been pulled from the conveyor device 3 to the holding area 6) may be switched adjacent next to the shelving unit 2 (in order to push the container A from the holding area 6 to the shelving unit 2). Similarly, a second container A positioned on one holding area 6, adjacent to the shelving unit 2 (the second container A has been pulled from the shelving unit 2 to the holding area 6) may be switched adjacent next to the conveyor device 3 (in order to push the container A from the holding area 6 to the conveyor device 3). Similarly, the swivelling unit 16 may be motorized for continuously driving the platform 5 around a vertical axis I about 360°.

In one or more embodiments, the containers exchange operations are carried out only by means of respective picking units 12, without the provision of the aforementioned swivel unit 16. In this case, each platform 5 may temporarily host a single container A, due to the fact that before loading a second container A on board of the platform 5, the picking unit 12 has to transfer the current onboard container A from the platform 5 to the shelving unit 2 or the conveyor device 3. According to this embodiment, the picking unit 12 may be driven alongside the current onboard container A in order to be positioned from one side of the current container A (where a pulling operation is carried out) to an opposite side (for actuating a pushing operation) and complete the transfer operations.

The automatic warehouse system 1 comprises at least one electronic control unit E (illustrated in FIG. 1) configured to control the operations for handling the containers A. Naturally, the system 1 may comprise a plurality of control units in communication to each other, for respectively driving different operation of the handling cycle.

According to the invention, the electronic control unit E is programmed for driving the transfer of containers A from the shelving unit 2 and the conveyor device 3, to the respective holding area 6, and exchanging the containers A with the conveyor device 3 and the shelving unit 2, sequentially or simultaneously. Preferably, the electronic control unit E is configured for enabling a simultaneous or sequential circulation of both empty containers A and formed full containers A. After the exchange operations of a pair of containers A are carried out, the electronic control unit E is configured for driving the vertical and horizontal sliding of the platform 5 along the conveyor device 3 and the shelving unit 2, in order to position the platform 5 coplanar with a determined branch of the conveyor device 3 and a compartment of the shelving unit 2. Once the platform 5 stops at the selected position, the shifting means 11 are actuated for carrying containers A onboard the holding areas 6.

The electronic control unit E may be programmed for driving the entire handling cycle in order to minimize the downtime periods.

The electronic control unit E may be configured for automatically selecting a determined sequence of positions in which the platform 5 stops for loading new containers A, based on an automated evaluation criterion. Said automated evaluation criterion may consider at least one of the following:
an information related to the containers A to be picked, such as the type of products contained, which may be acquired through reading a barcode present on the container A, before picking and/or placing it;
the intended delivery destination of the containers A;
timing of shipping;
other containers A previously picked in the same handling cycle.

In this connection, the system 1 may comprise a plurality of motion sensors configured for sending a command signal to the control unit E for confirming effective accomplishment of the different cycle steps (such as confirming the presence of containers A onboard the platform 5 and/or confirming release of the containers A on the conveyor branch 3 and the shelving unit 2).

During operation, the electronic control unit E may drive the following cycle:
sliding the platform 5 along the conveyor device 3 and the shelving unit 2,
stopping the platform 5 at a selected position in which the platform 5 is substantially coplanar with the conveyor device 3 and a determined compartment holding surface of the shelving unit 2,
pulling a full container A out from the shelving unit 2 by means of the shifting means 11 and sliding the full container A at a first holding area 6,
pulling an empty container A out from the conveyor device 3 by means of said shifting means 11 and sliding the empty container A at a second holding area 6,
driving the swivel unit 16 for swiveling the platform 5,
pushing the full and empty containers A, respectively towards the conveyor device 3 and the shelving unit 2.

It is to noted, that before the aforementioned pushing step, the electronic control unit E may drive sliding of the platform 5 (with the holding areas 6 loaded) for positioning the platform 5 at a new position for releasing the containers A temporarily hosted on the platform 5.

The present invention is also related to an automatic warehouse system 1 for handling product containers A comprising:
a shelving unit 2 comprising a plurality of compartments for holding and storing containers A arranged in rows,
a conveyor device 3 configured for automatically conveying a plurality of containers A,
at least one container exchange apparatus 4 interposed between said shelving unit 2 and said conveyor device 3, comprising:
at least one platform 5 provided for automatically receiving containers A from the shelving unit 2 and the conveyor device 3, said at least one platform 5 comprising holding areas 6 for temporarily hosting containers A to be transferred,
wherein the container exchange apparatus 4 comprises shifting means 1 associated with the platform 5, configured for exchanging containers A from the conveyor device 3 to the shelving unit 2, and vice-versa, via the platform 5,
a plurality of rails 8,8',10 extended along at one side of the shelving unit 2 and/or the conveyor device 3, for enabling travelling of the platform 5 along the conveyor device 3 and the shelving unit 2, an electronic control unit E programmed for driving the shifting means 11, so as to exchange containers A from the conveyor device 3 to the shelving unit 2, and vice-versa.

In one or more embodiments, the shifting means 11 comprises a swivel unit 16 associated with said platform 5, provided for swiveling the platform 5 around a vertical axis I.

In one or more embodiments, said plurality of rails 8,8',10 comprises:
- at least one horizontal rail 8 spaced at a side of the shelving unit 2 or the conveyor device 3,
- a beam element 9 slidably mounted on the horizontal rail 8,
- a vertical rail 10 provided on the beam element 9,
- wherein the platform 5 is slidably mounted on said vertical rail 10,
- so as to enable travelling of the platform 5 along horizontal and vertical directions X, Z.

In one or more embodiments, said shifting means 11 comprises at least one picking unit 12 slidably mounted on at least one auxiliary rail 13, along a further horizontal direction Y.

In one or more embodiments, said picking unit 12 is configured for pushing a container A from one holding area 6 to the conveyor device 3 and/or the shelving unit 2, and pulling a container A from the conveyor device 3 and/or the shelving unit 2 to one holding area 6.

In one or more embodiments, said picking unit 12 comprises a picking element 15 configured for gripping a lateral portion of the container A, controllable between a passive position and an active position.

The present invention is also related to a computer program product, directly loadable in the memory of at least one computer and including software code portions to cause the device to perform the method of the annexed claims. As compared to the prior art, the method and system 1 according to the present invention have the following advantages:
- all the operations for handling the containers A are totally automated,
- ensuring high repeatability and reliability of the operations,
- ensuring quick automated operations for handling the containers A,
- modulating the operations according to the logistic requirements.

Of course, without prejudice to the principle of the invention, the details of construction and the embodiments can be widely varied with respect to those described and illustrated, without thereby departing from the scope of the invention as defined by the claims that follow.

The invention claimed is:

1. A method for automatically handling a plurality of product containers, comprising:
   providing at least one container exchange apparatus interposed between a shelving unit and a conveyor device,
   wherein the container exchange apparatus comprises at least one platform provided for automatically receiving containers from the shelving unit and the conveyor device, said at least one platform comprising holding areas for temporarily hosting containers of the plurality of product containers to be transferred,
   wherein the at least one container exchange apparatus comprises shifting means associated with the at least one platform, configured for exchanging containers from the conveyor device to the shelving unit, and vice-versa, via the at least one platform,
   connecting said at least one platform to a plurality of rails,
   moving the at least one platform along the conveyor device and the shelving unit,
   stopping the at least one platform along a selected position in which the at least one platform is substantially coplanar with the conveyor device and a determined compartment holding surface of the shelving unit,
   driving said shifting means for exchanging containers from the conveyor device to the shelving unit, and vice-versa, and
   synchronizing a time at which an empty holding area of the holding areas is occupied by a new container to be exchanged, with the time at which another container is transferred from an occupied holding area of the holding areas to the conveyor device or the shelving unit.

2. The method of claim 1, wherein said shifting means comprises a swivel unit associated with said at least one platform, provided for swivelling the at least one platform around a vertical axis.

3. The method of claim 2, comprising:
   pulling a first container out from the shelving unit by means of said shifting means and sliding the first container at a first holding area of the holding areas,
   pulling a second container out from the conveyor device by means of said shifting means and sliding the second container at a second holding area of the holding areas,
   driving the swivel unit for swivelling the at least one platform, and
   pushing the first and second containers, respectively towards the conveyor device and the shelving unit.

4. The method of claim 1, comprising driving simultaneously an automatic exchange of containers from said shelving unit to the conveyor device, and vice-versa.

5. The method of claim 1, comprising the step of driving the shifting means between a passive position in which the shifting means does not interfere with the containers conveyed on the conveyor device and stacked on the shelving unit, and an active position in which the shifting means drives a transverse movement of the containers for carrying selected containers onboard the holding areas.

6. The method of claim 1, comprising driving a simultaneous automatic circulation of both empty and full containers.

7. The method of claim 1, wherein the step of moving the at least one platform along the conveyor device and the shelving unit comprises horizontally and vertically sliding the at least one platform along horizontal and vertical directions.

8. The method of claim 1, wherein said plurality of rails comprises:
   at least one horizontal rail spaced at a side of the shelving unit or the conveyor device,
   a beam element slidably mounted on the at least one horizontal rail, and
   a vertical rail provided on the beam element,
   wherein the at least one platform is slidably mounted on said vertical rail so as to enable travelling of the at least one platform along horizontal and vertical directions.

9. The method of claim 1, wherein said shifting means comprises at least one picking unit slidably mounted on at least one auxiliary rail, along a further horizontal direction.

10. The method of claim 9, wherein said at least one picking unit is configured for pushing a container from one holding area to the conveyor device and/or the shelving unit, and pulling a container from the conveyor device and/or the shelving unit to the one holding area.

11. The method of claim 10, wherein said picking unit comprises a picking element configured for gripping a lateral portion of the container, controllable between a passive position and an active position.

\* \* \* \* \*